US012670900B2

(12) United States Patent
Caplow-Munro et al.

(10) Patent No.: US 12,670,900 B2
(45) Date of Patent: Jun. 30, 2026

(54) INTENT EVALUATION FOR SMART ASSISTANT COMPUTING SYSTEM

(71) Applicant: Microsoft Technology Licensing, LLC, Redmond, WA (US)

(72) Inventors: Devin Samuel Jacob Caplow-Munro, Seattle, WA (US); Amit Kaistha, Coppell, TX (US); Denys V Yaremenko, Bellevue, WA (US); Brett Andrew Tomky, Seattle, WA (US); Charbel Khawand, Sammamish, WA (US); Andrew James Hillenius, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 197 days.

(21) Appl. No.: 18/535,725

(22) Filed: Dec. 11, 2023

(65) Prior Publication Data

US 2025/0191582 A1 Jun. 12, 2025

(51) Int. Cl.
| | |
|---|---|
| *G10L 15/18* | (2013.01) |
| *G06V 10/764* | (2022.01) |
| *G06V 40/10* | (2022.01) |
| *G06V 40/20* | (2022.01) |
| *G10L 15/22* | (2006.01) |
| *G10L 15/25* | (2013.01) |

(52) U.S. Cl.
CPC ........ *G10L 15/1815* (2013.01); *G06V 10/764* (2022.01); *G06V 40/10* (2022.01); *G06V 40/20* (2022.01); *G10L 15/22* (2013.01); *G10L 15/25* (2013.01); *G10L 2015/223* (2013.01)

(58) Field of Classification Search
CPC ..... G10L 15/1815; G10L 15/22; G10L 15/25; G10L 2015/223; G10L 15/16; G10L 15/24; G06V 10/764; G06V 40/10; G06V 40/20; G06F 2203/0381; G06F 3/017; G06F 3/167; G06F 3/013
See application file for complete search history.

(56) References Cited

U.S. PATENT DOCUMENTS

| | | | |
|---|---|---|---|
| 2011/0112839 A1* | 5/2011 | Funakoshi | ............ G10L 15/083 704/E15.001 |
| 2016/0050394 A1 | 2/2016 | Segal | |
| 2019/0187787 A1 | 6/2019 | White et al. | |

(Continued)

OTHER PUBLICATIONS

International Search Report and Written Opinion received for PCT Application No. PCT/US2024/055289, Feb. 21, 2025, 14 pages.

(Continued)

*Primary Examiner* — Abul K Azad
(74) *Attorney, Agent, or Firm* — Alleman Hall LLP

(57) ABSTRACT

A method for user intent evaluation includes receiving recorded speech of a human user. One or more attention indicators are detected in an image of the human user. Using a trained command recognition model, a command confidence is estimated indicating a confidence that the recorded human speech includes a command for a smart assistant computing system. Based at least in part on detecting the one or more attention indicators, and the command confidence exceeding a command confidence threshold, the human user is classified as intending to interact with the smart assistant computing system.

20 Claims, 9 Drawing Sheets

200

RECEIVE RECORDED HUMAN SPEECH OF A HUMAN USER
202

DETECT ONE OR MORE ATTENTION INDICATORS IN AN IMAGE OF THE HUMAN USER CAPTURED VIA A CAMERA
204

ESTIMATE A COMMAND CONFIDENCE THAT THE RECORDED HUMAN SPEECH INCLUDES A COMMAND FOR A SMART ASSISTANT DEVICE
206

BASED AT LEAST IN PART ON DETECTING THE ONE OR MORE ATTENTION INDICATORS, AND THE COMMAND CONFIDENCE EXCEEDING A THRESHOLD, CLASSIFY THE HUMAN USER AS HAVING AN INTERACTION INTENT
208

(56)                References Cited

U.S. PATENT DOCUMENTS

| | | | |
|---|---|---|---|
| 2020/0050353 A1 | 2/2020 | Chiu et al. | |
| 2020/0341546 A1 | 10/2020 | Yuan | |
| 2022/0109822 A1 | 4/2022 | Winter et al. | |
| 2022/0399008 A1* | 12/2022 | Vempaty | G10L 15/1815 |
| 2023/0253009 A1 | 8/2023 | Konzelmann | |
| 2024/0029730 A1* | 1/2024 | Prasad | G10L 15/22 |

OTHER PUBLICATIONS

Waibel, et al., "SMaRT: the Smart Meeting Room Task at ISL", In Proceedings of IEEE International Conference on Acoustics, Speech, and Signal Processing, Apr. 6, 2003, 4 Pages.

* cited by examiner

200

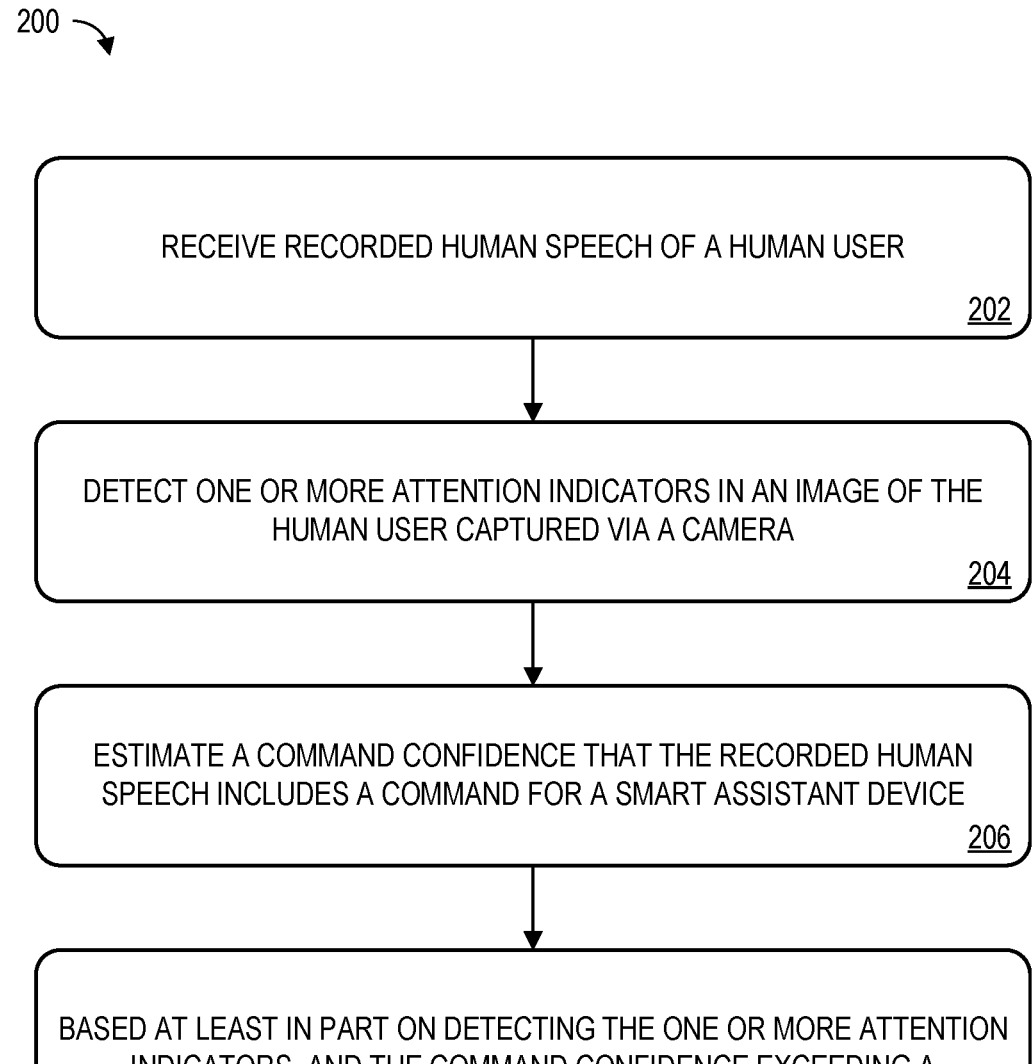

RECEIVE RECORDED HUMAN SPEECH OF A HUMAN USER

202

DETECT ONE OR MORE ATTENTION INDICATORS IN AN IMAGE OF THE HUMAN USER CAPTURED VIA A CAMERA

204

ESTIMATE A COMMAND CONFIDENCE THAT THE RECORDED HUMAN SPEECH INCLUDES A COMMAND FOR A SMART ASSISTANT DEVICE

206

BASED AT LEAST IN PART ON DETECTING THE ONE OR MORE ATTENTION INDICATORS, AND THE COMMAND CONFIDENCE EXCEEDING A THRESHOLD, CLASSIFY THE HUMAN USER AS HAVING AN INTERACTION INTENT

INTENT EVALUATION FOR SMART ASSISTANT COMPUTING SYSTEM

BACKGROUND

Smart assistant computing systems can use speech recognition and natural language processing (NLP) technologies to interpret and execute a wide array of verbal commands. As a result, these assistants can engage in more natural, conversational interactions with users. In some cases, smart assistant computing systems detect that they are being addressed by a human user after the user says a predefined wake word.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for user intent evaluation includes receiving recorded speech of a human user. One or more attention indicators are detected in an image of the human user. Using a trained command recognition model, a command confidence is estimated indicating a confidence that the recorded human speech includes a command for a smart assistant computing system. Based at least in part on detecting the one or more attention indicators, and the command confidence exceeding a command confidence threshold, the human user is classified as intending to interact with the smart assistant computing system.

BRIEF DESCRIPTION OF THE DRAWINGS

FIG. 2 illustrates an example method for user intent evaluation.

DETAILED DESCRIPTION

Figure 1:
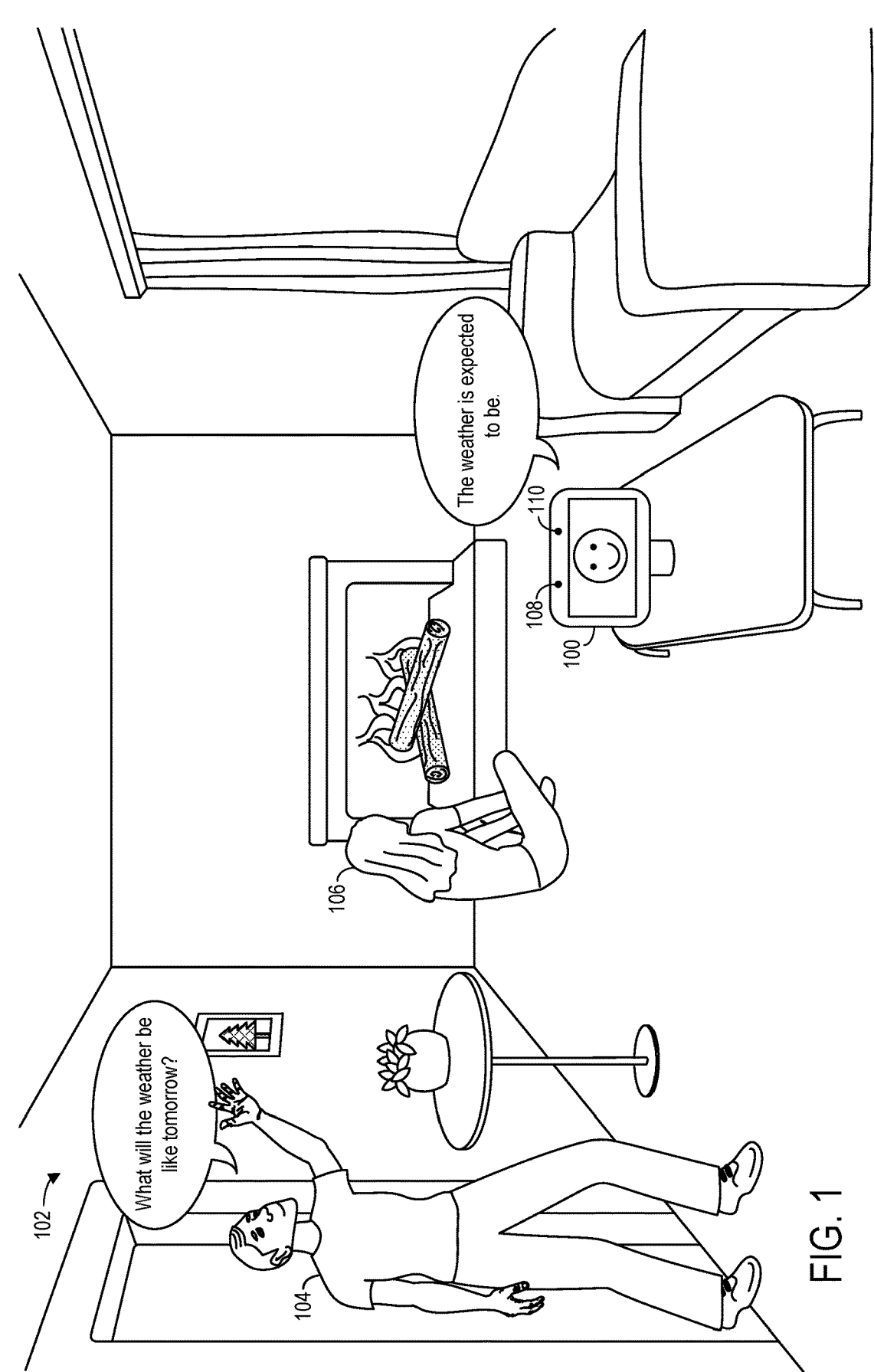
FIG. 1 schematically illustrates use of an example smart assistant computing system.

Some smart assistant computing systems rely heavily on the detection of a pre-defined wake word to transition from a passive listening state to an active one. This approach, while effective in reducing false activations and preserving privacy, can disrupt the fluidity of human-device interaction. For instance, while the use of a wake word ensures that the device is only active when called upon, it can often result in an experience that feels stilted and unintuitive for users. Users may be required to remember and articulate specific wake words, which can hinder the spontaneous and natural flow of communication.

Accordingly, the present disclosure is directed to techniques for user intent evaluation that can enable a smart assistant computing system to determine when a user intends to interact with it, without requiring the user to use a predefined wake word. In some examples, the smart assistant computing system is implemented as a single smart assistant device located in the user's environment. In other examples, the smart assistant computing system includes two or more computing devices that may be physically remote from one another. In other words, in some examples, the steps described herein are performed by a single smart assistant device to evaluate whether a user intends to interact with the device. Additionally, or alternatively, any or all of the steps described herein may be outsourced to one or more suitable other computing devices of the smart assistant computing system, such as a server computing device, which evaluates whether the user intends to interact with the smart assistant computing system.

In some examples, the computing system uses audio and/or video processing algorithms to analyze environmental inputs. Using such algorithms, the system may recognize specific patterns, tones, or other cues that indicate a user's intention to interact with the computing system. For instance, the system may analyze the direction of the user's gaze, their facial expressions, the tone of their voice, and/or specific gestural cues to determine the likelihood of an intended interaction.

The techniques described herein beneficially enable smart assistant computing systems to engage with users in a manner that more closely mimics natural human communication, thereby improving human-computer interaction. In particular, this approach may be advantageous in multi-user scenarios, a common setting in households and workplaces. In such environments, conversations between multiple individuals are frequent, posing a challenge for conventional smart assistants that rely on wake words. For instance, in some cases, smart assistant computing systems may struggle to determine whether a spoken command is directed at the system or is part of an ongoing conversation between different people. By contrast, however, the techniques described herein enable the system to intelligently determine when it is being addressed, as opposed to when users are conversing with each other, which improves the user experience.

FIG. 1 schematically illustrates use of an example smart assistant computing system 100. As described in more detail below, in some examples smart assistant computing system 100 may be configured to receive and process natural language inputs. A smart assistant computing system may be configured to provide any of a wide variety of different functions. As non-limiting examples, smart assistant computing systems may be configured to respond to voice commands, enabling users to control various tasks hands-free, such as turning on lights, adjusting thermostats, playing music, or setting alarms. Smart assistant computing systems may be configured to respond to verbal queries for information—e.g., offering weather updates, news briefings, or traffic conditions upon request. Smart assistant computing systems may assist with scheduling—e.g., setting reminders for appointments or sending alerts for upcoming events.

Smart assistant computing systems may be used for home automation—e.g., by controlling smart home devices like lights, thermostats, security cameras, and/or smart locks. Smart assistant computing systems may be used with digital entertainment content—e.g., they may be used to play music, audiobooks, videos, and/or podcasts. Smart assistant computing systems may be used to assist in making phone calls, sending messages, and/or conducting video calls. Smart assistant computing systems may be used for shopping, enabling users to make shopping lists, order products online, and/or track orders. It will be understood that the above functions are non-limiting examples, and that a smart assistant computing system as described herein may have any variety of suitable capabilities, including additional or alternative functions to those described herein.

In the illustrated example, the smart assistant computing system is implemented as a dedicated smart assistant device having a tablet-like form factor that includes an integrated display. However, it will be understood that this is non-limiting. Rather, a "smart assistant computing system" as described herein may be implemented as any suitable system of one or more computing devices, each device having any suitable hardware configuration and form factor. As non-limiting examples, a smart assistant computing system may be implemented as, or include, a mobile computing device (e.g., smartphone, tablet), desktop computer, laptop computer, server computer, smart television, media center, dedicated assistant device (e.g., including a microphone and speaker), or have any other suitable form factor. In some examples, a smart assistant computing system may be implemented as computing system 800 described below with respect to FIG. 8.

In FIG. 1, the smart assistant device is located in a real-world environment 102, including human users 104 and 106. In this example, human user 104 is speaking the question "What will the weather be like tomorrow?" As indicated above, it can be difficult for smart assistant computing systems to infer when a user is addressing the system and expecting a response, particularly in cases where no predefined wake word is used, and/or in cases where multiple users are present. For instance, user 104 would likely not appreciate it if the smart assistant device responds to the user's question while the user is intending to interact with user 106, and not the smart assistant device. Conversely, frustration may occur if user 104 intends to interact with the smart assistant device, but the device does not offer a response due to presence of user 106 in the same environment.

As such, according to the techniques described herein, the smart assistant computing system evaluates the user's intent before a computing device of the system (such as a dedicated smart assistant device) outputs a response to the user's question. In some cases, as will be described in more detail below, this is done based on one or both of recorded speech received by the smart assistant computing system, and images of the surrounding environment captured by the smart assistant computing system. To this end, in the example scenario of FIG. 1, the smart assistant computing device includes a camera 108 for capturing images of the surrounding environment, and a microphone 110 for recording speech of human users.

As discussed above, in some cases, the smart assistant device 100 may be operatively connected with one or more other computing devices using a wired connection, or may employ a wireless connection via Wi-Fi, Bluetooth, or any other suitable wireless communication protocol. For example, the smart assistant device may be communicatively coupled to one or more other computing devices via a network. The network may take the form of a local area network (LAN), wide area network (WAN), wired network, wireless network, personal area network, or a combination thereof, and may include the Internet.

As such, any or all functions described herein as being performed by a "smart assistant computing system" may be performed entirely by a dedicated smart assistant device, such as device 100, and/or by one or more other computing devices. For instance, in addition to or instead of receiving recorded human speech and/or captured images via microphones/cameras that are integrated into a dedicated smart assistant device, the smart assistant computing system may receive such recorded speech and/or captured images from separate devices over a network—e.g., other microphones/cameras present in the surrounding environment. Similarly, any responses delivered by the smart assistant computing system may be output via integrated displays, speakers, and/or other output devices of a dedicated smart assistant device, and/or delivered via one or more external devices communicatively coupled with the smart assistant computing system. Furthermore, any or all of the functions related to evaluating a user's intent, and generating a response to user input, may be performed by a dedicated smart assistant device and/or any suitable external devices (such as a server computing device communicatively coupled with the smart assistant device).

In the example of FIG. 1, the smart assistant computing system has determined that user 104 intends to interact with the smart assistant computing system, and therefore outputs a response to the user's inquiry. This determination may be achieved by analyzing any suitable contextual cues, such as words spoken by the user, the user's volume and/or tone of voice, the direction of the user's gaze, whether the user is making eye contact with the smart assistant device, body orientation, gestural indications that typically accompany direct communication, etc. By doing so, the device can accurately activate only when intended, reducing unintended activations and enhancing the user experience in a communal setting. This feature may be particularly beneficial in maintaining the flow of human conversations while still providing the accessibility and convenience of a smart assistant. In this manner, the smart assistant computing system may serve as an unobtrusive yet responsive part of the environment, capable of distinguishing between general conversation and specific commands directed towards it, thereby improving its utility and effectiveness in various contexts.

Accordingly, FIG. 2 illustrates an example method for user intent evaluation. As discussed above, steps of method 200 are primarily described as being performed by a smart assistant computing system. In some examples, all steps of method 200 are performed by the same single computing device, such as a dedicated smart assistant. In other examples, one or more steps of method 200 are performed by, or in cooperation with, one or more external devices, such as a remote server computer. In general, any computing device implementing steps of method 200 may have any suitable capabilities, hardware configuration, and form factor. In some examples, method 200 may be implemented by computing system 800 described below with respect to FIG. 8.

Steps of method 200 may be implemented using any suitable machine learning (ML) and/or artificial intelligence (AI) techniques. Such ML and/or AI models may be implemented by any or all computing devices of the smart assistant computing system. Non-limiting examples of suitable ML and AI technologies that may be used will be described below with respect to FIG. 8.

At 202, method 200 includes receiving recorded human speech of a human user. As discussed above, in some examples, the human speech is recorded by the smart assistant computing system using an integrated microphone of a dedicated smart assistant device. Additionally, or alternatively, the recorded human speech may be recorded by another suitable computing device of the smart assistant computing system.

Continuing with method 200, at 204, the method includes detecting one or more attention indicators in an image of the human user. Similar to the recorded speech, in some examples, the image of the human user is captured by a camera integrated into a dedicated smart assistant device. Additionally, or alternatively, the image may be captured by another suitable device of the smart assistant computing system.

Figure 3:
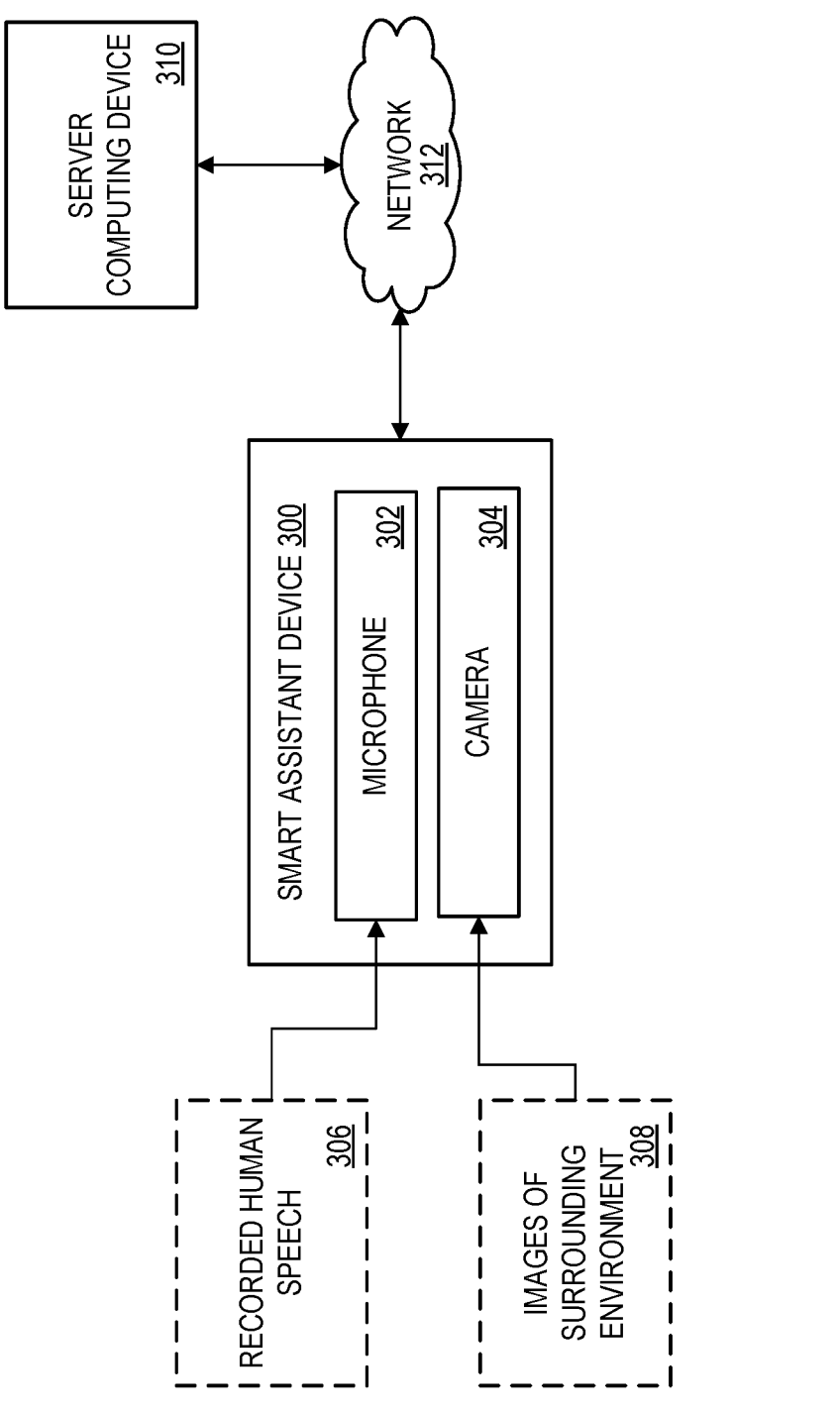
FIG. 3 schematically illustrates a smart assistant computing system receiving recorded human speech and images of a surrounding environment.

FIG. 3 schematically illustrates an example smart assistant device 300 receiving recorded human speech and images of a surrounding environment. Specifically, in this example, smart assistant device 300 includes a microphone 302 and a camera 304. Via the microphone, the smart assistant device receives recorded human speech 306 of a human user. Via camera 304, the smart assistant device receives one or more images 308 captured of a surrounding environment, which may depict the human user from which the recorded speech originates.

By processing the recorded human speech and/or images of the surrounding environment, the intent of the human user may be evaluated. As discussed above, such processing may be done by the smart assistant device and/or any other suitable computing devices with which the smart assistant device is communicatively coupled. For instance, in FIG. 3, the smart assistant device is communicatively coupled with a server computing device 310 via a computer network 312 to collectively provide a smart assistant computing system. In some examples, either or both of the recorded human speech 306 and the captured images 308 may be transmitted to server 310 for processing, in addition to or as an alternative to such processing occurring on the smart assistant device.

Processing the recorded human speech may include generating a digital transcript of the speech. For instance, in some examples, a speech recognition model may be used to convert recorded audio into a transcript of human speech through a multi-step process. First, an audio signal may be captured at a microphone and digitized, converting sound waves into a format the model can process. The speech recognition model may break the audio into smaller segments to analyze the sounds phonetically. The sounds may then be interpreted (e.g., via suitable deep learning models) to map the recorded sounds to known patterns of language and speech. For instance, a speech recognition model may consider context, language structure, and/or variations in speech such as accents and intonation. Finally, the interpreted audio signal may be converted into written text, producing a transcript of the spoken words. In some cases, this process occurs rapidly, allowing for near real-time transcription.

Images of a surrounding environment may be processed in any suitable way to detect indications that a human user intends to interact with a smart assistant computing system—referred to herein as "attention indicators." Various examples are schematically illustrated with respect to FIGS. 4A-4D. In some examples, detecting attention indicators in an image of a human user may include a determination that a gaze vector of the human user is directed toward a computing device of the smart assistant computing system—e.g., a dedicated smart assistant device in the user's environment. Additionally, or alternatively, detecting attention indicators may include a determination that the human user is performing a predefined, recognized gesture, such as an interaction-initiating gesture. It will be understood that these examples are non-limiting—e.g., other suitable attention indicators may include the user's posture (e.g., turned toward the device or turned away), presence of any detected devices in the environment (e.g., a smartphone held to the user's ear is likely an indication that the user does not intend to interact with the smart assistant device), the position of the user within the environment (e.g., near the position of the smart assistant device, or outside the room), etc.

Figure 4A:
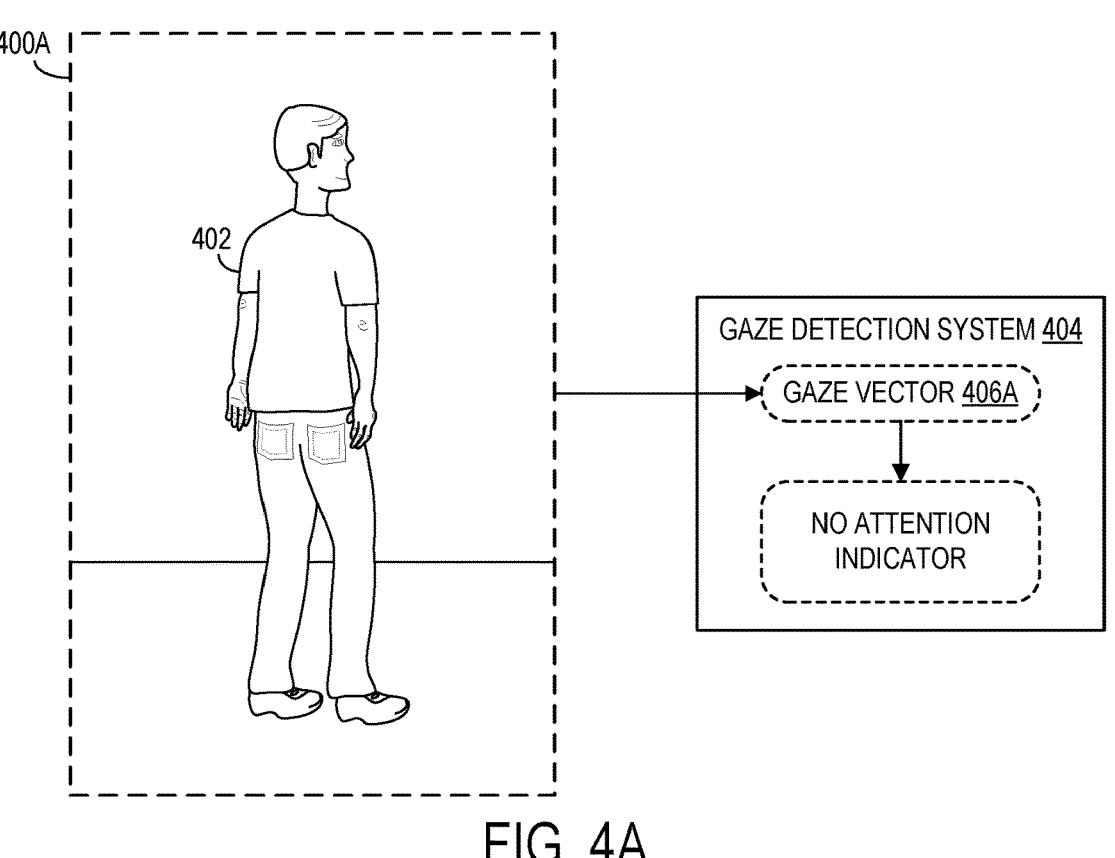
FIGS. 4A-4D schematically illustrate detection of attention indicators in example images of a surrounding environment.

FIG. 4A shows an example image 400A depicting a human user 402. In this example, the image is provided to a gaze detection system 404, which estimates a gaze vector 406A of the human user. In this example, the gaze detection system determines that the gaze vector of the human user is not directed toward the smart assistant computing system, and thus no attention indicator is detected.

A "gaze detection system" is implemented via any suitable combination of computer software, hardware, and/or firmware. Aspects of the gaze detection system may be implemented on the smart assistant computing system and/or any other suitable computing device, such as server computer 310 shown in FIG. 3. In some cases, gaze detection may be performed via suitable trained ML and/or AI models.

In general, gaze detection involves capturing an image in which one or both of a user's eyes are visible and detectable. In cases where no user eyes are visible and/or detectable, the system may determine that the user is not gazing toward the smart assistant computing system. In one example scenario, in cases where the user's eyes are detected, image processing algorithms may be used to analyze the image to identify features related to the eyes, including the position of the pupils, the orientation of the eyelids, and/or the positioning of the eyes within the facial structure. Based on this analysis, the system may estimate the user's gaze vector. This vector represents the direction of the user's gaze, determined by the line of sight inferred from the position and orientation of the eyes. In some cases, the system may account for any detected head movements or changes in orientation to accurately determine the gaze vector.

In another example scenario, a suitable ML/AI model (such as a convolutional neural net) may be used as a feature detector for eye contact. For instance, images depicting a human face may be input to the model, which then attempts to detect if the user is looking toward the camera or not. Eye contact detection may be used in addition to, or instead of, gaze detection as described above. For instance, in some cases, a detection that the user is making eye contact with the camera may be a stronger indication that the user intends to interact with the system than if the user is merely gazing in the direction of the camera.

In other words, a user's gaze vector and/or a detected eye contact state can be used to infer the user's intent to interact with a smart assistant computing system. For instance, in some examples, the image of the user is captured using a camera integrated into a dedicated smart assistant device. In such cases, if the user's estimated gaze vector is toward the perspective of the camera, then this may serve as an indicator that the user intends to address the smart assistant computing system. Additionally, or alternatively, in some examples, images of the user are captured via a camera that is external to a smart assistant device, but still communicatively coupled with the smart assistant computing system. In such cases, if the user's estimated gaze vector is toward a known position of the smart assistant device relative to the camera's field-of-view, then this may serve as an indicator that the user intends to interact with the smart assistant computing system. By contrast, in cases where the user's gaze vector is not toward any components of the smart assistant computing system (and/or not detectable), then this may serve as an indicator that the user does not intend to interact with the smart assistant computing system.

Figure 4B:
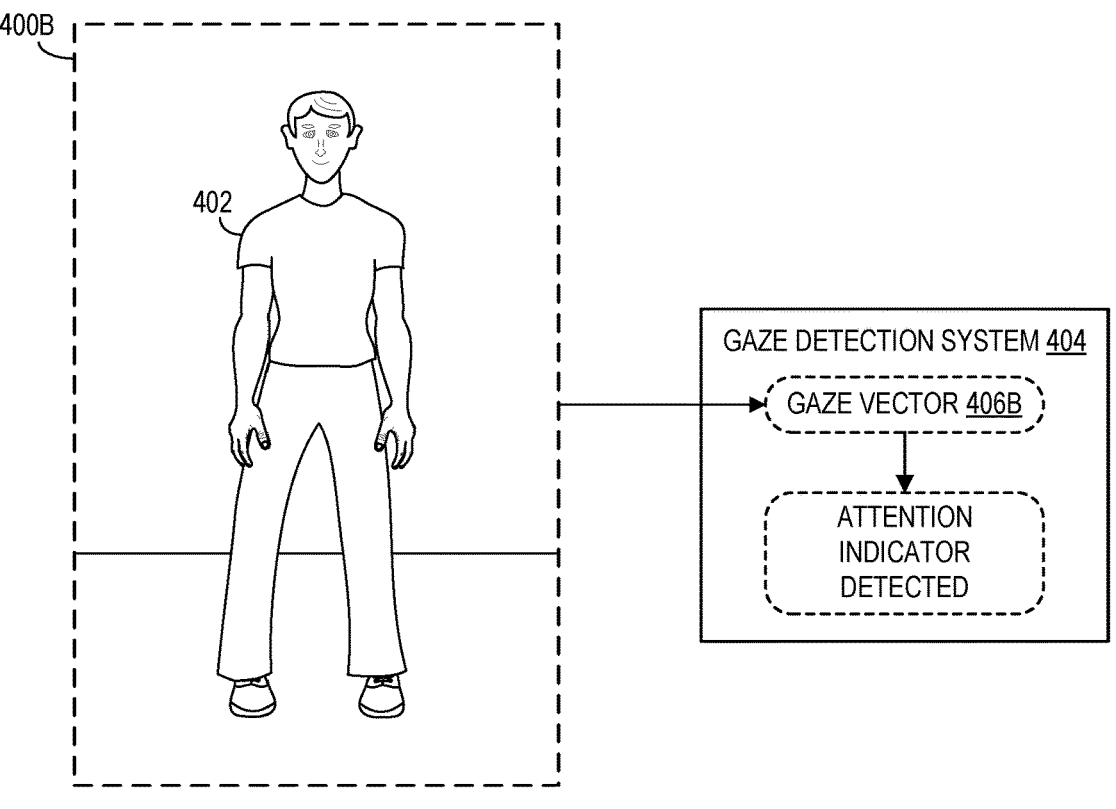

FIG. 4B schematically depicts an example where the user's gaze vector is toward the smart assistant computing system. FIG. 4B shows another example image 400B of user 402. This image is provided to gaze detection system 404, which determines a gaze vector 406B based on image 400B. In this case, the gaze vector is toward the smart assistant computing system, which serves as an intention indicator that the user intends to interact with the smart assistant computing system.

Figure 4C:
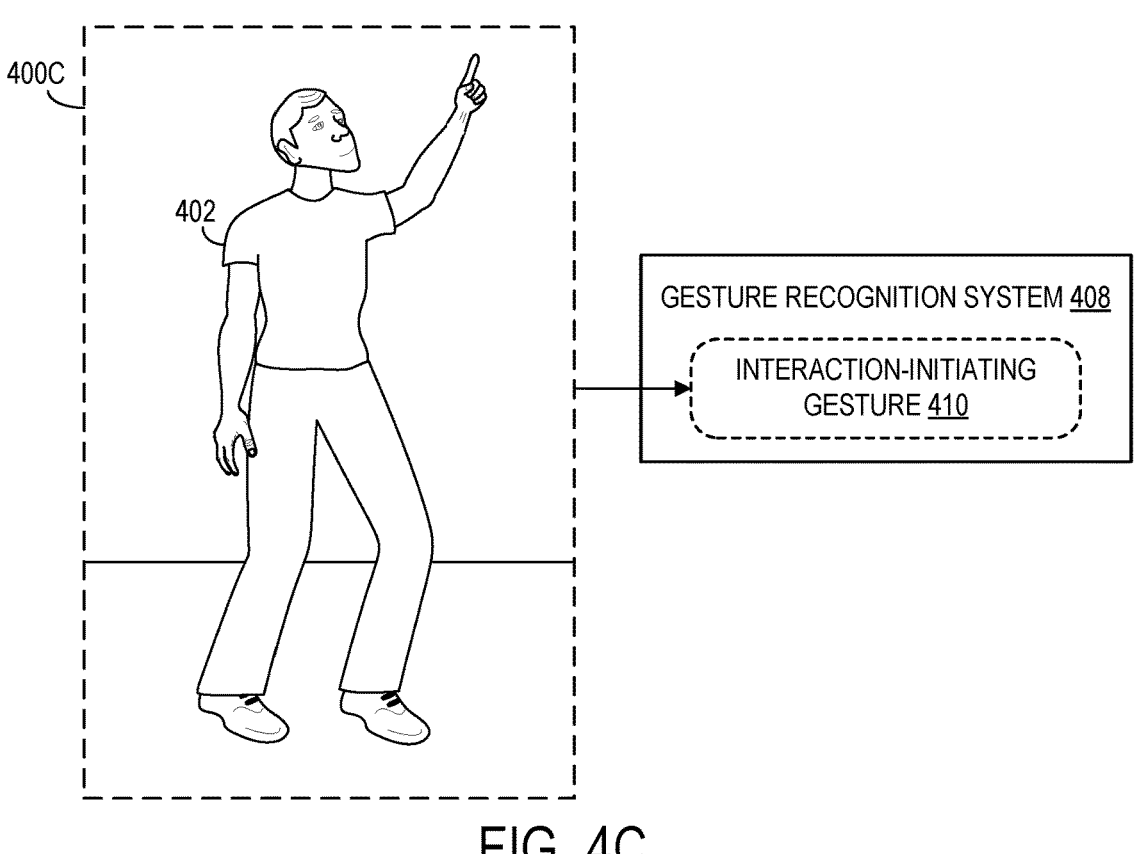
Figure 4D:
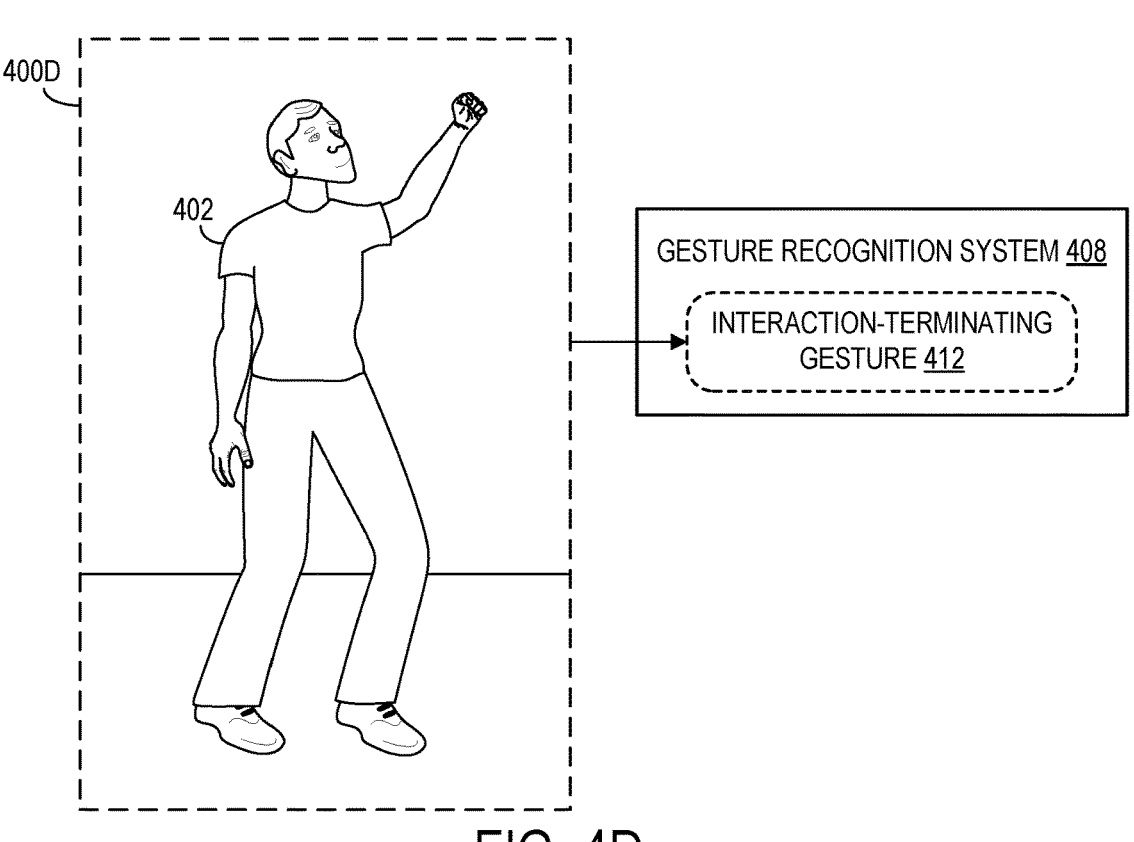

Additionally, or alternatively, the user may signal their intention to interact with the smart assistant computing system using a predetermined gesture. This is schematically illustrated with respect to FIG. 4C, showing another example image 400C of user 402. This image is provided to a gesture recognition system 408, which detects that the user is performing a recognized interaction-initiating gesture. It will be understood that any arbitrary human gesture may be recognized and responded to by the smart assistant computing system, and therefore the specific gestures shown in FIGS. 4C and 4D are non-limiting.

A user's gesture may be recognized in any suitable way. As with the gaze detection system described above, the gesture recognition system may be implemented via any suitable combination of computer software, hardware, and/or firmware. Aspects of the gesture recognition system may be implemented by a smart assistant device and/or any suitable computing devices of the smart assistant computing system (e.g., server computer 310 of FIG. 3). The gesture recognition system may be implemented via one or more trained ML/AI models.

In general, the gesture detection process begins with capturing an image or series of images where the user's body, particularly their hands and/or arms, are visible. Image processing algorithms may be used to analyze these images to identify specific gestures by recognizing patterns such as hand shapes, the orientation of fingers, and/or the movement trajectory of the hands and arms in relation to the user's body. Upon successful identification of a gesture, the system may interpret the gesture as a command or input.

For instance, in the example of FIG. 4C, the user's gesture is recognized as a predefined interaction-initiating gesture, which signals that the user intends to interact with the smart assistant computing system. It will be understood that any suitable gesture may be used, such as an open palm, extended finger, "peace sign," etc. In some cases, two or more different gestures may be recognized as interaction-initiating gestures. In some examples, the smart assistant computing system recognizes a plurality of different predefined gestures, which may be treated as different inputs, commands, and/or signals as to the user's intent to interact with the device.

For instance, in some examples, the interaction-initiating gesture is one of a plurality of predefined gestures that also includes an interaction-terminating gesture. FIG. 4D shows another image 400D of user 402. Image 400D is provided to gesture recognition system 408, which recognizes the user's gesture as an interaction-terminating gesture 412. Such a gesture may signal a user's intent to stop interacting with the smart assistant computing system—e.g., so that the system does not attempt to respond to upcoming speech by the user (unless other indicators suggest that the user does intend to interact with the system). In one example scenario, the user begins speaking to the smart assistant computing system to begin a new interaction. At a subsequent time, the user intends to speak to another person in the room, and thus performs the interaction-terminating gesture. In such cases, upon detecting the interaction-terminating gesture in a subsequent image depicting the user at the subsequent time, the smart assistant computing system may classify the human user as no longer intending to interact with the smart assistant computing system.

Figures 5, 6:
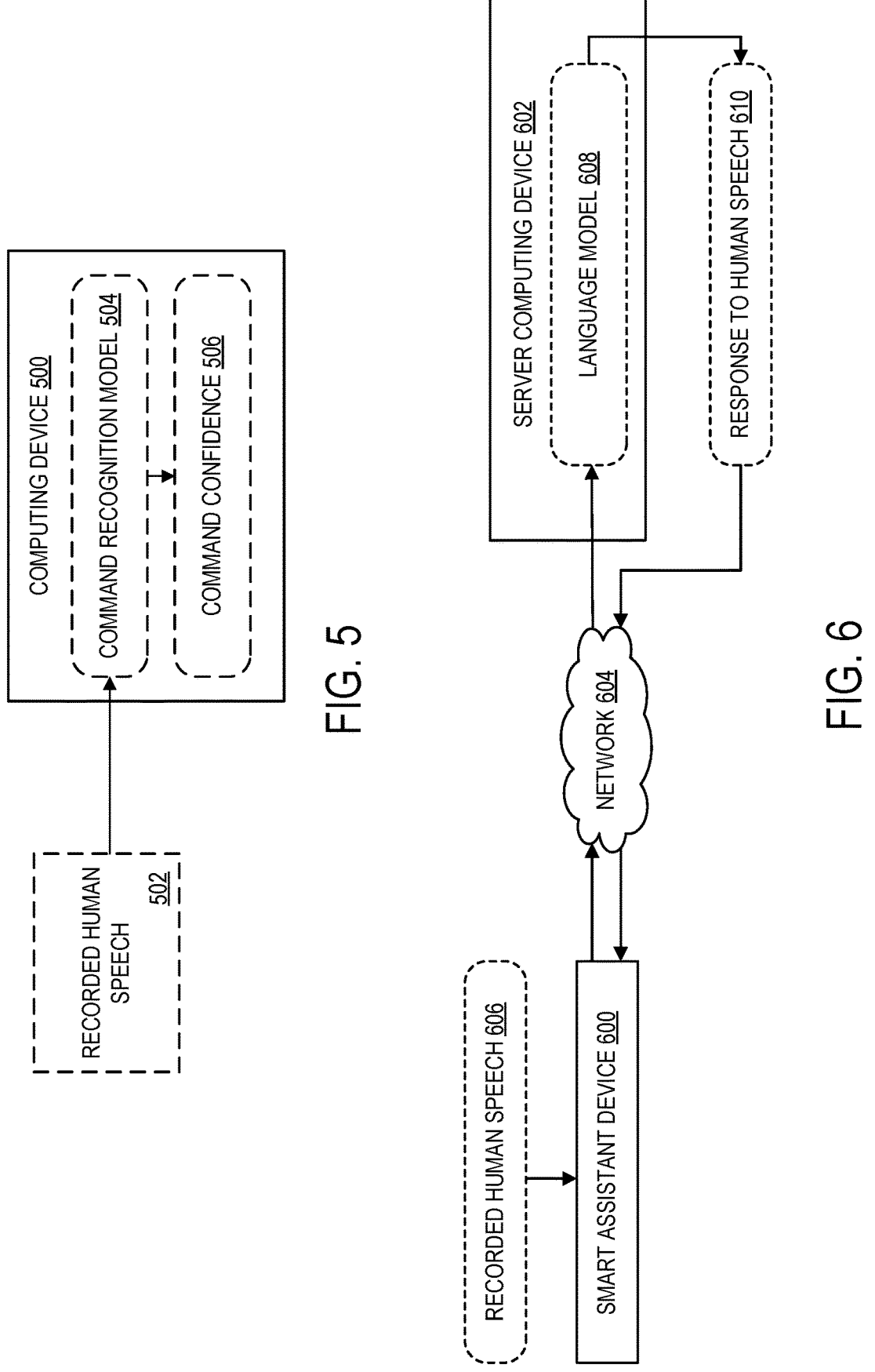
FIG. 5 schematically illustrates estimation of a command confidence that recorded human speech includes a command for a smart assistant computing system.
FIG. 6 schematically illustrates a server computing device generating a response to recorded human speech using a language model.

Returning briefly to FIG. 2, at 206, method 200 includes, using a trained command recognition model, estimating a command confidence that the recorded human speech includes a command for the smart assistant computing system. This is schematically illustrated with respect to FIG. 5, showing an example computing device 500. Computing device 500 may take the form of a dedicated smart assistant device, for instance, or another computing device of a smart assistant computing system (such as a server computer). As shown, computing device 500 receives recorded human speech 502, which is provided to a trained command recognition model 504. The command recognition model outputs a command confidence value 506, expressing the model's confidence that the recorded human speech includes a command for the smart assistant computing system.

The command recognition model takes the form of a suitable ML/AI model trained to analyze samples of human speech and determine the likelihood of them including a command for a smart assistant computing system. This model operates by processing input audio data, where speech is captured and converted into a format suitable for analysis. The model, trained on a diverse dataset of speech samples including various commands, learns to recognize patterns and characteristics associated with spoken commands. When a new speech sample is presented to the model, it analyzes the audio data, comparing it with learned patterns from its training. The model then outputs a confidence value, which is a numerical representation of the probability that the speech sample includes a command. This confidence value is in some examples expressed as a percentage or a probability score between 0 and 1. The determination of this confidence value involves complex calculations within the model that assess various aspects of the speech, such as phonetics, intonation, speech rhythm, and/or contextual cues.

It will be understood that the command recognition model may process any suitable data in addition to, or instead of, recorded human speech. For instance, in some examples, the command recognition model may consider various applicable context parameters, such as the user's recent actions, previous inferences about user intent, and/or the capabilities of the device itself. For instance, if the system detects that the user is speaking about a specific document that the system can access, the smart assistant computing system may be relatively more likely to determine that the user intends to interact with the system than if the user is speaking about a document that the system cannot find or otherwise does not have access to.

Once the command confidence value is output by the command recognition model, it is compared to a command confidence threshold. If the command confidence value exceeds the command confidence threshold, the smart assistant computing system determines that the recorded human speech likely includes a command. If the command confidence value does not exceed the command confidence threshold, the computing device determines that the recorded human speech likely does not include a command.

It will be understood that any suitable numerical value may be used for the command confidence threshold depending on the implementation. For instance, in some contexts, it may be preferable for the smart assistant computing system to be relatively more responsive to potential requests or commands, even if the risk of false activations is higher. As such, the command confidence threshold may be set relatively lower. By contrast, in some contexts, it may be preferable for the smart assistant computing system to only respond to clear and explicit attempts to interact with it, and therefore the command confidence threshold may be set relatively higher.

Furthermore, in some examples, the command confidence threshold may be dynamically changed over time based on the current context. It will be understood that changing the command confidence threshold based on context may achieve a similar effect to the command recognition model considering contextual information when outputting the command confidence value. As one example, upon classifying a human user as intending to interact with the smart assistant computing system, the system may reduce the command confidence threshold for a subsequent time interval. In this manner, the smart assistant computing system may continue to treat subsequent speech by the human user as commands or inputs to the system, rather than ambient speech that should be ignored. Similarly, if the user performs an interaction-terminating gesture, or otherwise indicates that an interaction is over, then the command confidence threshold may be increased for a subsequent time. As another example, the command confidence threshold may differ depending on the number of users in the room—e.g., the threshold may be relatively higher if more users are present. As another example, the command confidence threshold may differ depending on the time of day—e.g., the threshold may be relatively lower at night, when speech is less frequent and therefore more likely to be directed toward the smart assistant computing system. It will be understood that any number of suitable factors may be considered in setting the command confidence threshold for any given context. Dynamically changing the command confidence threshold in this manner (e.g., increasing or decreasing the threshold based on contextual factors) may beneficially improve human-computer interaction and reduce the burden of user input to the computing device.

Returning briefly to FIG. 2, at 208, method 200 includes, based at least in part on detecting the one or more attention indicators, and the command confidence value exceeding the command confidence threshold, classifying the human user as intending to interact with the smart assistant computing system. This classification may occur based on any suitable consideration or balancing of the detection attention indicators, and the command confidence value. For instance, in some examples, the command confidence may be relatively low, while the user is clearly gazing toward a smart assistant device and performing a recognized gesture. In such cases, the smart assistant computing system may determine that the user intends to interact even in spite of the command confidence threshold.

In some cases, after the human user is classified as intending to interact with the system, the system outputs a response generated based at least in part on the recorded human speech. In other words, the recorded human speech may be provided as part or all of the input to a language model This language model, which can be implemented on a dedicated smart assistant device, a remote server, or any other suitable computing platform, is responsible for generating a suitable response to the user.

This is schematically illustrated with respect to FIG. 6, showing another example smart assistant device 600. In this example, the smart assistant device is communicatively coupled with a server computing device 602 over a network 604. The smart assistant device receives recorded human speech, which is provided to the server computing device 602 as an input to a language model 608 implemented by the server computing device. In some examples, the language model is previously trained to receive a digital representation of human speech as an input, and generate natural language responses as an output. In FIG. 6, the language model outputs a response 610 to the human speech. In other words, in this example, the smart assistant device records the human speech via a microphone, transmits the recorded human speech to the server computing device over the network, and receives a response from the server computing device over the computer network.

In some examples, the response generated by the language model may be twofold: it may include a spoken response that the smart assistant articulates to the user, and/or it may manifest as a specific action undertaken by the smart assistant. This dual-response capability enables the smart assistant to not only provide verbal feedback but also to perform tasks or execute commands as directed by the user. Any suitable language model may be used, which may be implemented via any suitable ML or AI model(s). In general, the language model's design uses algorithms trained to understand and interpret human language, allowing it to process a wide range of user commands effectively. The flexibility in the model's implementation, whether locally or remotely, ensures scalability and adaptability of the smart assistant computing system to various operational environments. This design allows the smart assistant to offer a highly interactive and responsive user experience, bridging the gap between command input and appropriate action or feedback.

Notably, the response may be generated based on any speech received from the user, other users, and/or other pertinent contextual information. For instance, in some examples, the response may be generated based at least in part on speech received before the "recorded human speech" used to evaluate the user's intent. As one example, the language model may be provided with all or part of a transcript of the user's detected speech over a window of time—e.g., the last five seconds, the last minute, the last ten minutes, or other suitable window. Similarly, the response may be generated based at least in part on speech that occurs after the "recorded human speech" used to evaluate the user's intent.

As will be described in more detail below, in some examples, the smart assistant computing system may generate responses to the human speech regardless of whether the system has determined that the user intends to interact. For instance, any generated responses may be proactively output to the user whenever it is determined that the user's attention is directed toward the smart assistant computing system, and/or at any other suitable time. As one example, upon determining that the user was discussing a potential meeting with another person, the smart assistant computing system may respond by automatically scheduling the meeting, regardless of whether the user has been classified as intending to interact.

Figure 7A:
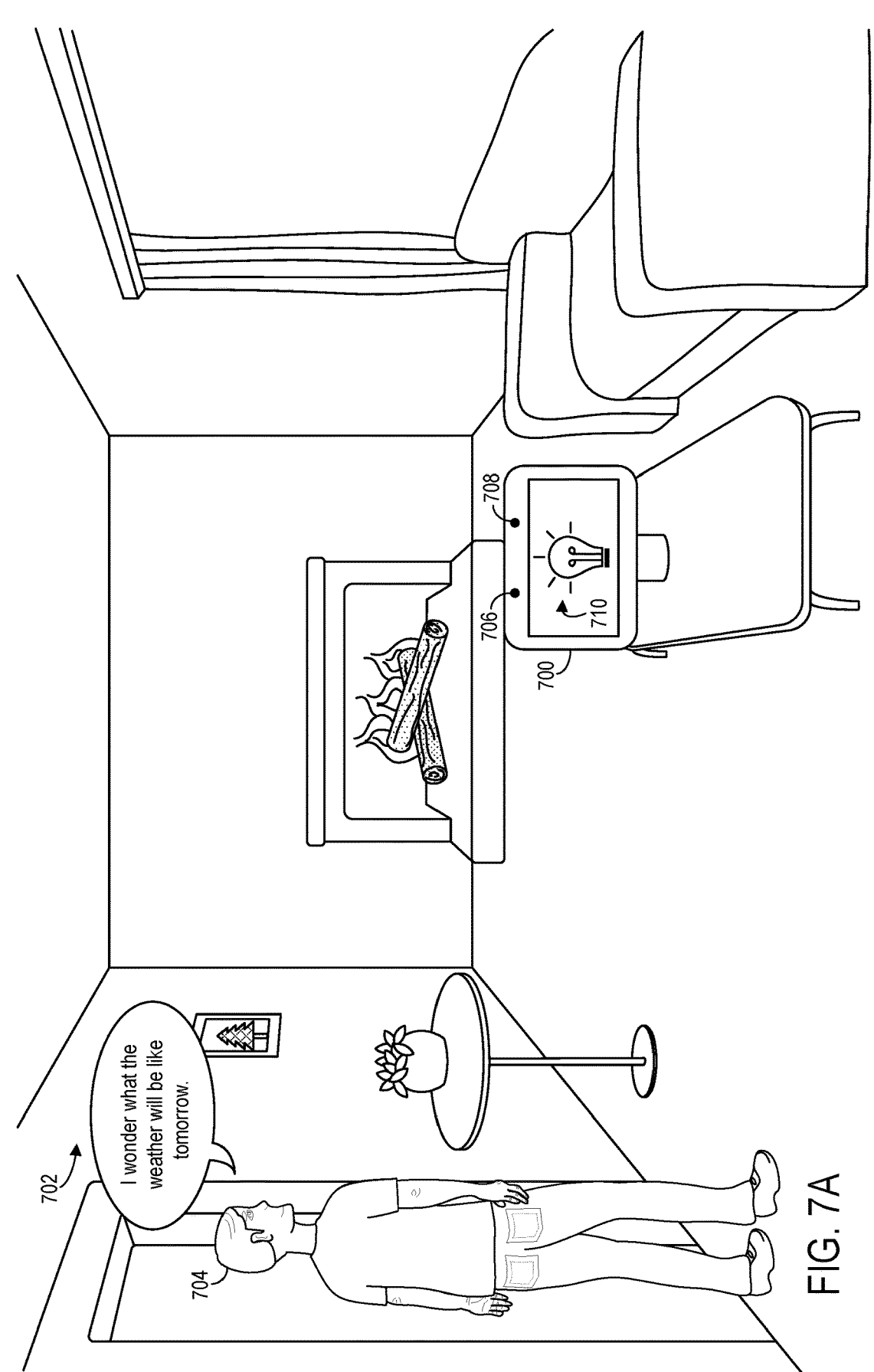
FIGS. 7A and 7B schematically illustrate use of an example smart assistant computing system that displays response pending and intent recognition notifications.
Figure 7B:
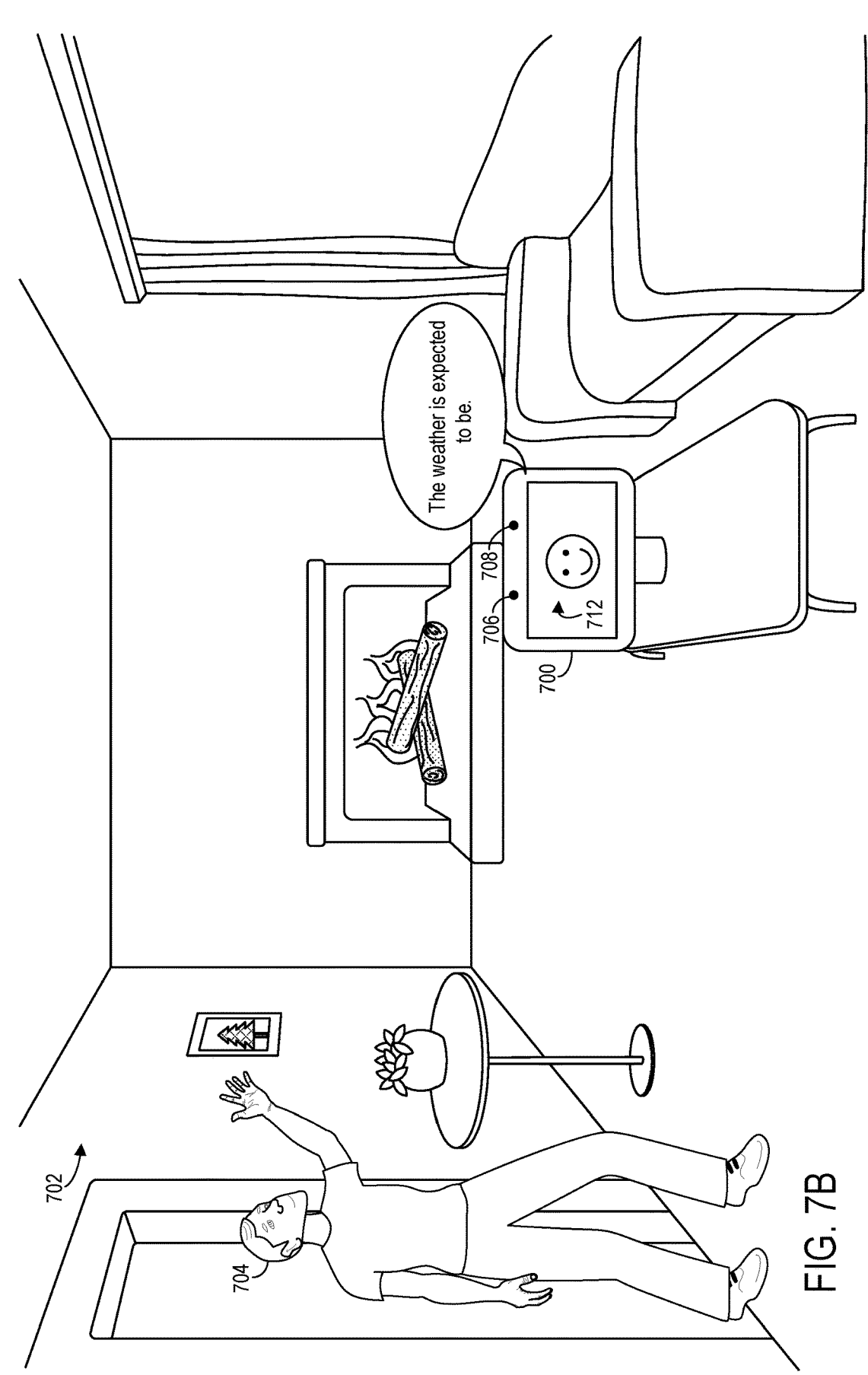

This is schematically illustrated with respect to FIGS. 7A and 7B, showing another example smart assistant computing system 700 in an environment 702. In FIG. 7A, a human user 704 is speaking the question "I wonder what the weather will be like tomorrow . . . ." The presence of the human user, and the user's query, are detected by the smart assistant computing system via a microphone 706 and camera 708. In this example, the user's speech is provided to a language model, which then generates a response to the user's query.

However, in this example, the user has not been classified as intending to interact with the smart assistant computing system. For instance, in this example, the user is gazing away from the smart assistant computing system, and is not performing any particular interaction-initiating gestures. In other words, in this example, the response is generated prior to classification of the human user as intending to interact with the smart assistant computing system. This may beneficially improve computer-human interaction, enabling the computing system to provide helpful responses or suggestions to the user proactively rather than only after receiving an explicit command. As such, prior to outputting the response, the smart assistant computing system displays a response pending notification 710, which in this non-limiting example takes the form of a graphical lightbulb symbol. The response pending notification may serve as an indication to the user that the smart assistant computing system has generated a response that may be pertinent to the user's current context or task—e.g., in this case, the response may include a weather forecast that will answer the user's detected query. It will be understood that the response pending notification may take any suitable form—e.g., it may take the form of a displayed symbol, a blinking light, an audio tone, and/or activation of a haptic feedback system. Similarly, it will be understood that the device may output any suitable number and variety of different notifications in addition to, or instead of, a response pending notification. For instance, the system may notify the user of received messages, push notifications, and/or updates on background tasks, previous requests, etc.

In some examples, the response pending notification may serve as a prompt for the user to confirm whether they intend to interact with the smart assistant computing system. For instance, in the depicted example, the user may notice the response pending notification and then look toward the smart assistant computing system, perform an interaction-initiating device, begin explicitly addressing the device, and/or otherwise signal that the user intends to interact with the smart assistant computing system, which may be interpreted by the system as an intent confirmation. The system may then output its generated response.

This scenario is illustrated with respect to FIG. 7B. As shown, the user has signaled their intent to interact with the smart assistant computing system by turning to face the device and performing an interaction-initiating gesture. The smart assistant computing system then begins responding to the user. In this example, because the user has been classified as intending to interact with the smart assistant computing system, the device displays an intent recognition notification 712. In this example, the intent recognition notification takes the form of a graphical "happy face" symbol, although this is non-limiting. Rather, as with the response pending notification described above, the intent recognition notification may take any suitable form.

Upon classifying the human user as intending to interact with the smart assistant computing system, this classification may persist for any suitable length of time. In some cases, the smart assistant computing system may periodically reevaluate whether the user intends to interact. For instance, the interaction may be terminated upon detection of an interaction-terminating gesture, an explicit statement by the user that the interaction is finished (e.g., "thank you, that's all"), body language changes such as the user turning away, picking up a phone, etc. By contrast, other indicators may serve that the user intends to continue interacting with the device. For instance, in one example, the smart assistant computing system may receive a subsequent image of the human user captured by a camera at a subsequent time, and detect one or more subsequent attention indicators in the subsequent image (e.g., the user gazing toward the device). In such cases, the user may be classified as still intending to interact with the device at the subsequent time.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
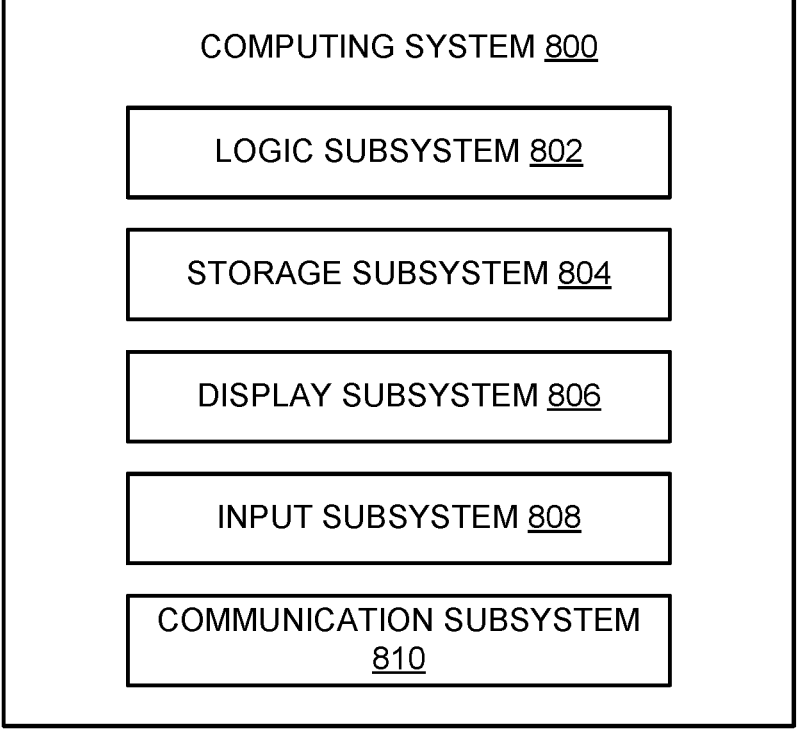
FIG. 8 schematically shows an example computing system.

FIG. 8 schematically shows a simplified representation of a computing system 800 configured to provide any to all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., a hidden Markov model (HMM) or a conditional random field (CRF). The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user data may only be collected with the utmost respect for user privacy (e.g., user data may be collected only when the user owning the data provides affirmative consent, and/or the user owning the data may be notified whenever the user data is collected). If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible, anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components may be trained on diverse, representative datasets that include sufficient relevant data for diverse users and/or populations of users. In particular, training data sets may be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components may be designed to provide context as to how they operate, so that implementers of ML and/or AI systems can be accountable for decisions/assessments made by the systems. For example, ML and/or AI systems may be configured for replicable behavior, e.g., when they make pseudo-random decisions, random seeds may be used and recorded to enable replicating the decisions later. As another example, data used for training and/or testing ML and/or AI systems may be curated and maintained to facilitate future investigation of the behavior of the ML and/or AI systems with regard to the data. Furthermore, ML and/or AI systems may be continually monitored to identify potential bias, errors, and/or unintended outcomes.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for user intent evaluation comprises: receiving recorded human speech of a human user; detecting one or more attention indicators in an image of the human user; using a trained command recognition model, estimating a command confidence that the recorded human speech includes a command for a smart assistant computing system; and based at least in part on detecting the one or more attention indicators, and the command confidence exceeding a command confidence threshold, classifying the human user as intending to interact with the smart assistant computing system. In this example or any other example, the method further comprises, upon classifying the human user as intending to interact with the smart assistant computing system, reducing the command confidence threshold for a subsequent time interval. In this example or any other example, the command confidence threshold is dynamically changed based at least in part on a number of users in a surrounding environment of the smart assistant computing system. In this example or any other example, the method further comprises detecting a subsequent one or more attention indicators in a subsequent image of the human user captured at a subsequent time, and based at least in part on the subsequent one or more attention indicators, classifying the human user as still intending to interact with the smart assistant computing system at the subsequent time. In this example or any other example, the one or more attention indicators include a determination that a gaze vector of the human user is directed toward the smart assistant computing system. In this example or any other example, the one or more attention indicators include a determination that the human user is performing an interaction-initiating gesture. In this example or any other example, the interaction-initiating gesture is one of a plurality of predefined gestures, the plurality of predefined gestures including at least the interaction-initiating gesture and an interaction-terminating gesture, and wherein the method further comprises, upon detecting the interaction-terminating gesture in a subsequent image captured at a subsequent time, classifying the human user as no longer intending to interact with the smart assistant computing system at the subsequent time. In this example or any other example, the method further comprises, upon classifying the human user as intending to interact with the smart assistant computing system, displaying an intent recognition notification at the smart assistant computing system. In this example or any other example, the method further comprises, based at least in part on classifying the human user as intending to interact with the smart assistant computing system, outputting, via the smart assistant computing system, a response generated based at least in part on the recorded human speech. In this example or any other example, the method further comprises, prior to outputting the response, prompting the human user to confirm whether they intend to interact with the smart assistant computing system, and outputting the response upon receiving an intent confirmation from the human user. In this example or any other example, the response is generated by a language model previously trained to receive a digital representation of human speech as an input, and generate natural language responses as an output. In this example or any other example, the language model is implemented by a server computing device, and wherein the method further comprises recording the recorded human speech at a microphone of the smart assistant computing system, transmitting the recorded human speech to the server computing device over a computer network, and receiving the response from the server computing device over the computer network. In this example or any other example, the response is generated prior to classification of the human user as intending to interact with the smart assistant computing system, and wherein the method further comprises, prior to outputting the response, displaying a response pending notification at the smart assistant computing system.

In an example, a smart assistant computing system comprises: a logic subsystem; and a storage subsystem holding instructions executable by the logic subsystem to: receive recorded human speech of a human user; detect one or more attention indicators in an image of the human user; using a trained command recognition model, estimate a command confidence that the recorded human speech includes a command for a smart assistant computing system; and based at least in part on detecting the one or more attention indicators, and the command confidence exceeding a command confidence threshold, classify the human user as intending to interact with the smart assistant computing system. In this example or any other example, the instructions are further executable to, upon classifying the human user as intending to interact with the smart assistant computing system, reduce the command confidence threshold for a subsequent time interval. In this example or any other example, the one or more attention indicators include a determination that a gaze vector of the human user is directed toward the smart assistant computing system. In this example or any other example, the one or more attention indicators include a determination that the human user is performing an interaction-initiating gesture. In this example or any other example, the instructions are further executable to, based at least in part on classifying the human user as intending to interact with the smart assistant computing system, output, via the smart assistant computing system, a response generated based at least in part on the recorded human speech. In this example or any other example, the response is generated prior to classification of the human user as intending to interact with the smart assistant computing system, and wherein the instructions are further executable to, prior to outputting the response, display a response pending notification at the smart assistant computing system.

In an example, a method for user intent evaluation at a smart assistant computing device comprises: recording human speech of a human user via a microphone of the smart assistant computing system; detecting one or more attention indicators in an image of the human user captured via a camera of the smart assistant computing system; using a trained command recognition model, estimating a command confidence that the recorded human speech includes a command for the smart assistant computing system; based at least in part on detecting the one or more attention indicators, and the command confidence exceeding a command confidence threshold, classifying the human user as intending to interact with the smart assistant computing system; and outputting a response generated based at least in part on the human speech.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for user intent evaluation, the method comprising:

receiving recorded human speech of a human user;

detecting one or more attention indicators in an image of the human user;

using a trained command recognition model, estimating a command confidence that the recorded human speech includes a command for a smart assistant computing system;

based at least in part on detecting the one or more attention indicators, and the command confidence exceeding a command confidence threshold, classifying the human user as intending to interact with the smart assistant computing system; and upon classifying the human user as intending to interact with the smart assistant computing system, reducing the command confidence threshold for a subsequent time interval.

2. The method of claim 1, wherein the one or more attention indicators include a determination that a gaze vector of the human user is directed toward the smart assistant computing system.

3. The method of claim 1, wherein the one or more attention indicators include a determination that the human user is performing an interaction-initiating gesture.

4. The method of claim 3, wherein the interaction-initiating gesture is one of a plurality of predefined gestures, the plurality of predefined gestures including at least the interaction-initiating gesture and an interaction-terminating gesture, and wherein the method further comprises, upon detecting the interaction-terminating gesture in a subsequent image captured at a subsequent time, classifying the human user as no longer intending to interact with the smart assistant computing system at the subsequent time.

5. The method of claim 1, further comprising, upon classifying the human user as intending to interact with the smart assistant computing system, displaying an intent recognition notification at the smart assistant computing system.

6. The method of claim 1, further comprising, based at least in part on classifying the human user as intending to interact with the smart assistant computing system, outputting, via the smart assistant computing system, a response generated based at least in part on the recorded human speech.

7. The method of claim 6, further comprising, prior to outputting the response, prompting the human user to confirm whether they intend to interact with the smart assistant computing system, and outputting the response upon receiving an intent confirmation from the human user.

8. The method of claim 6, wherein the response is generated by a language model previously trained to receive a digital representation of human speech as an input, and generate natural language responses as an output.

9. The method of claim 8, wherein the language model is implemented by a server computing device, and wherein the method further comprises recording the recorded human speech at a microphone of the smart assistant computing system, transmitting the recorded human speech to the server computing device over a computer network, and receiving the response from the server computing device over the computer network.

10. The method of claim 6, wherein the response is generated prior to classification of the human user as intending to interact with the smart assistant computing system, and wherein the method further comprises, prior to outputting the response, displaying a response pending notification at the smart assistant computing system.

11. A smart assistant computing system, comprising:

a logic subsystem; and a storage subsystem holding instructions executable by the logic subsystem to:

receive recorded human speech of a human user;

detect one or more attention indicators in an image of the human user;

using a trained command recognition model, estimate a command confidence that the recorded human speech includes a command for the smart assistant computing system; and based at least in part on detecting the one or more attention indicators, and the command confidence exceeding a command confidence threshold, classify the human user as intending to interact with the smart assistant computing system, wherein the command confidence threshold is dynamically changed based at least in part on a number of users in a surrounding environment of the smart assistant computing system.

12. The smart assistant computing system of claim 11, wherein the instructions are further executable to, upon classifying the human user as intending to interact with the smart assistant computing system, reduce the command confidence threshold for a subsequent time interval.

13. The smart assistant computing system of claim 11, wherein the one or more attention indicators include a determination that a gaze vector of the human user is directed toward the smart assistant computing system.

14. The smart assistant computing system of claim 11, wherein the one or more attention indicators include a determination that the human user is performing an interaction-initiating gesture.

15. The smart assistant computing system of claim 11, wherein the instructions are further executable to, based at least in part on classifying the human user as intending to interact with the smart assistant computing system, output, via the smart assistant computing system, a response generated based at least in part on the recorded human speech.

16. The smart assistant computing system of claim 14, wherein the response is generated prior to classification of the human user as intending to interact with the smart assistant computing system, and wherein the instructions are further executable to, prior to outputting the response, display a response pending notification at the smart assistant computing system.

17. A method for user intent evaluation at a smart assistant computing system, the method comprising:

recording human speech of a human user via a microphone of the smart assistant computing system;

detecting one or more attention indicators in an image of the human user captured via a camera of the smart assistant computing system;

using a trained command recognition model, estimating a command confidence that the recorded human speech includes a command for the smart assistant computing system;

based at least in part on detecting the one or more attention indicators, and the command confidence exceeding a command confidence threshold, classifying the human user as intending to interact with the smart assistant computing system;

outputting a response generated based at least in part on the human speech;

detecting a subsequent one or more attention indicators in a subsequent image of the human user captured at a subsequent time; and based at least in part on the subsequent one or more attention indicators, classifying the human user as still intending to interact with the smart assistant computing system at the subsequent time.

18. The method of claim 17, further comprising, upon classifying the human user as intending to interact with the smart assistant computing system, displaying an intent recognition notification at the smart assistant computing system.

19. The method of claim 17, further comprising, prior to outputting the response, prompting the human user to confirm whether they intend to interact with the smart assistant computing system, and outputting the response upon receiving an intent confirmation from the human user.

20. The method of claim 17, wherein the response is generated by a language model previously trained to receive a digital representation of human speech as an input, and generate natural language responses as an output;

wherein the language model is implemented by a server computing device, and wherein the method further comprises transmitting the recorded human speech to the server computing device over a computer network, and receiving the response from the server computing device over the computer network.

* * * * *